United States Patent [19]

Alexander

[11] 3,996,806
[45] Dec. 14, 1976

[54] HYDROSTATIC TRANSMISSION WITH OSCILLATING OUTPUT

[75] Inventor: Frank N. Alexander, Hutchinson, Kans.

[73] Assignee: The Cessna Aircraft Company, Wichita, Kans.

[22] Filed: July 14, 1975

[21] Appl. No.: 595,940

[52] U.S. Cl. .................................. 74/60; 56/296
[51] Int. Cl.² ....................................... F16H 23/10
[58] Field of Search ............ 74/25, 56, 60; 56/296, 56/297

[56] References Cited
UNITED STATES PATENTS

| | | | |
|---|---|---|---|
| 2,619,839 | 12/1952 | Love | 74/60 |
| 3,006,324 | 10/1961 | Shaw | 74/60 X |
| 3,104,511 | 9/1963 | Clark | 56/296 |
| 3,763,639 | 10/1973 | Grillot | 56/296 |

FOREIGN PATENTS OR APPLICATIONS 304,555  1/1929  United Kingdom .................. 74/60

*Primary Examiner*—William R. Cline
*Assistant Examiner*—Richard Gerard

[57] ABSTRACT

The invention is a hydrostatic device which converts rotary motion to oscillating motion for driving a sickle bar type mower by using a rotating cam plate to operate a rocker arm through a hydraulic coupling in the form of a pair of hydrostatic cylinders. The cylinders are continuously charged and due to valving openings in the pistons, the cylinders are continuously maintained in-phase with each other and the sickle bar which is being driven.

11 Claims, 6 Drawing Figures

HYDROSTATIC TRANSMISSION WITH OSCILLATING OUTPUT

BACKGROUND OF THE INVENTION

Agricultural equipment, such as combines, mowers, and windrowers, commonly employ a sickle bar knife to cut the crop. To operate, the sickle bar requires reciprocating motion. Since power on such machines is generally available only in the form of a rotating shaft, some means has been necessary to convert this rotary motion to reciprocating motion. There are two methods in general use which satisfy this need. Both involve purely mechanical construction. In one method, the rotary motion is converted directly to reciprocating motion by means of the simple crank and connecting rod mechanism. The other, more sophisticated method, as exemplified by U.S. Pat. No. 2,619,839, employs a wobble shaft, which, when rotated, causes a yoke to oscillate by virtue of its connection thereto by a set of mechanical bearings in a gimbaled arrangement. Reciprocating motion is then obtained by mounting an arm on the output shaft of the oscillating yoke. Both of these methods are subject to major complaints. The life of the mechanical anti-friction bearings is short because of the nature of the oscillating loads and the inevitable presence of backlash and shock loading as a result thereof. Mechanical drives have limited speed capability. This complaint is related to the previous in that, to achieve higher speeds would cause even higher magnitudes of shock loading on the bearings, further shortening their lives. Higher sickle bar speeds are desirable in order to allow higher vehicle ground speed, thereby increasing the machines productivity. The transmission of the vibrations caused by the shock loading into the framework of the machine is also objectionable in mechanical drives.

SUMMARY OF THE INVENTION

My invention overcomes all of these problems by providing a hydraulic, and thereby cushioned, coupling between the rotating mechanical input and the oscillating mechanical output of such a device as described above.

The invention comprises a rotating cam plate driven by the power source; an oscillating rocker arm shaft pivoted about an axis intersecting and at right angles to the axis of the cam plate; and hydraulic means to couple the two motions. This means consists of two pistons, extended in bores at diametrically opposite positions in the rocker arm and equidistant from the axis of the rocker arm shaft. These pistons mate against the inclined flat surface of the cam plate through hydraulic slipper shoes. The pistons each have a spring to maintain extension against the cam plate, a check valve to permit the piston bores to be recharged from the housing reservoir, and a rephasing passage to insure that the rocker arm motion does not drift out of phase with the cam plate motion.

When the rephasing passage closes and the piston becomes a solid strut, force is transferred from the cam plate to the rocker arm on the drive half of the cycle. On the idle half of the cycle, the piston extends due to the force of its spring and recharges its cylinder through the check valve consisting of a ball and spring or similar means. The start of the drive half of the cycle initiates the rephasing described above.

On the back side of the cam plate is a pair of balancing pads connected hydrostatically to the cylinders through passages in the cam plate. The pads are sized to equalize the load on the front and back of the cam plate, thus reducing eccentricity and friction.

The primary object of the invention is to provide a dependable, service-free, long life method of converting rotary power to oscillatory power, for applications involving higher than fractional horsepower, such as operating the cutter bar on a mowing sickle.

A second object of the invention is to provide higher operating speeds than currently feasible with the present mechanical drives.

Another object of the present invention is to reduce the level of vibrations caused by the present mechanical converters.

DESCRIPTION OF THE PREFERRED EMBODIMENT

Figure 6:
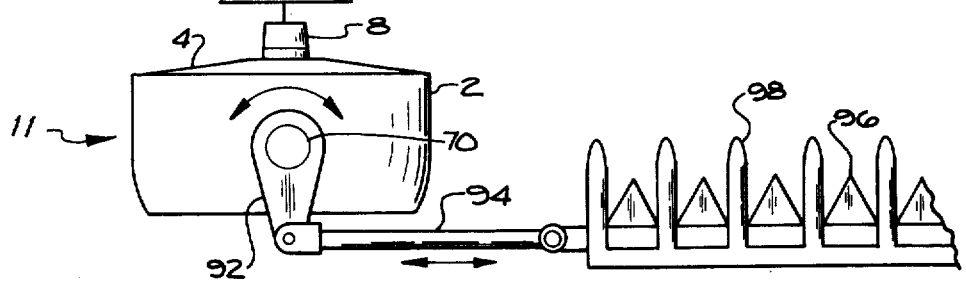
FIG. 6 is a bottom view showing the device connected to the mower and power source.

FIG. 6 illustrates the oscillating hydrostatic transmission generally by reference numeral 11. Transmission 11 is driven by any power source 1 through rotating input shaft 8. The oscillating output shaft 70, extending from housing 2, is attached to a movable mower blade 96 through crank 92 and connecting rod 94. The stationary mower blade 98 contains movable blade 96 as it moves back and forth in an oscillating linear motion.

Figure 3:
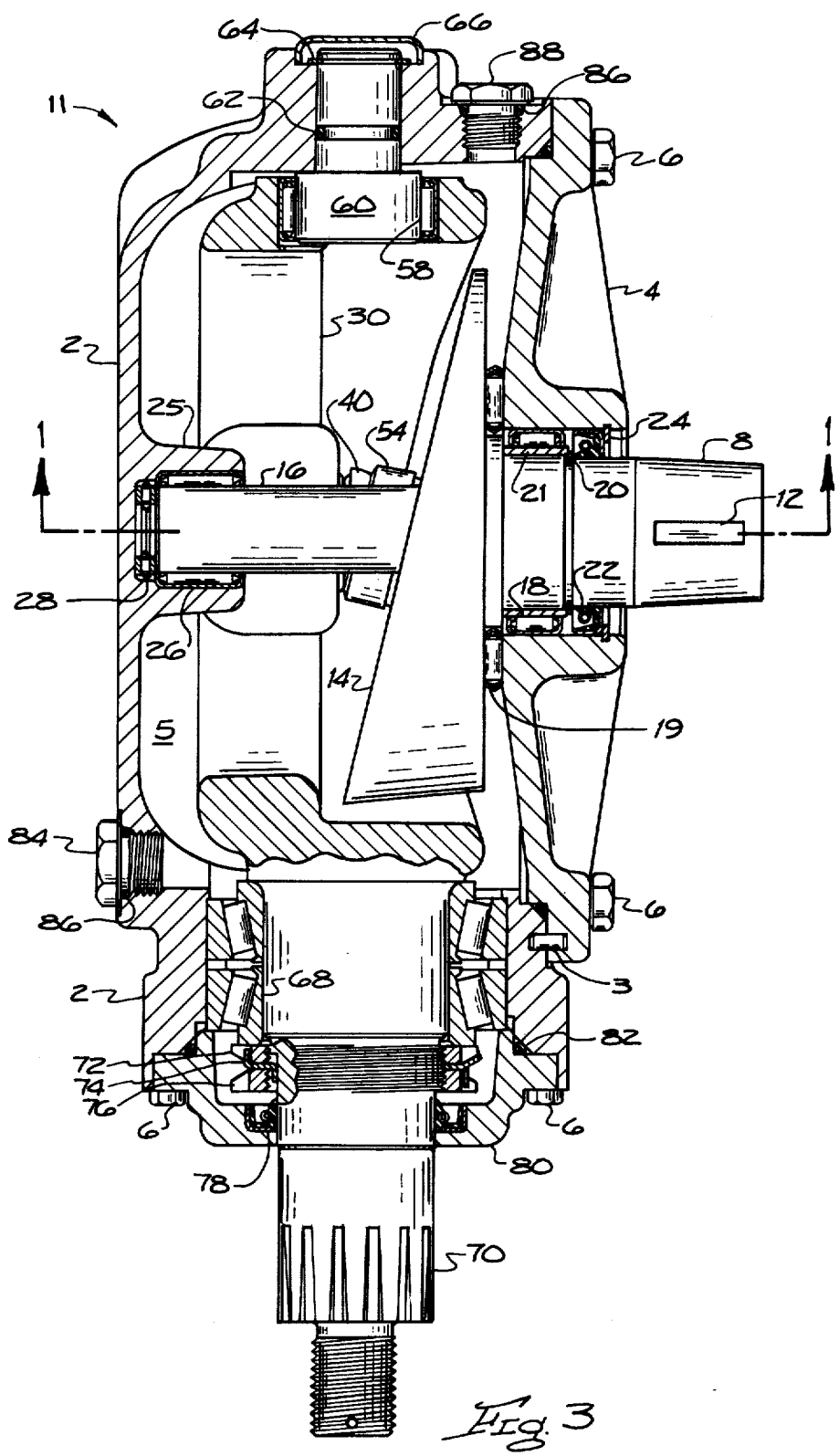
FIG. 3 is a section taken along line 3 — 3 3 of FIG. 2 with the rocker arm at mid-stroke.

Referring to FIG. 3, which is a section taken through the center of the transmission 11, both the rotating input shaft 8 and the oscillating output shaft 70 may be seen. The axis of these shafts intersect at right angles. Input shaft 8 is supported by bearing 18 and bearing race 21 in cover plate 4. Bearing race 21 is retained by retaining ring 20. Tapped hole 10 (FIG. 1) and key 12 provide means to attach combination flywheel — V-belt — sheave (not shown) to shaft 8, through which the external power source may be connected. The flywheel is useful in supplying the uneven torque requirements of the transmission. Output shaft 70 is supported by roller bearings 58 and tapered roller bearings 68. Bearing 58 is supported on stationary shaft 60 which is supported by housing 2, held by retaining ring 64, sealed by O-ring 62, and enclosed by cover 66. Shaft is locked in place to bearings 68 by nuts 72 and 70 76 and lock washer 74. Bearings 68 are in turn locked in place in housing 2 by means of bearing cover plate 80, which is fastened to housing 2 by means of cap screws 6.

O-ring 82 and shaft seal 78 seal the bearing cover plate 80.

Input shaft 8 is connected integrally to cam plate 14, which has a flat back surface perpendicular to the shaft axis and a flat front surface, inclined at an angle to the back surface. The degree of inclination controls the arc of oscillation of the output shaft 70. In the embodiment shown, the inclination angle is 13°, providing an oscillation arc of two times 13° or 26°. To support the moments applied to cam plate 14, an extension shaft 16 is anchored into shaft 8 and supported on its free end by bearing 26 in housing 2.

Figure 1:
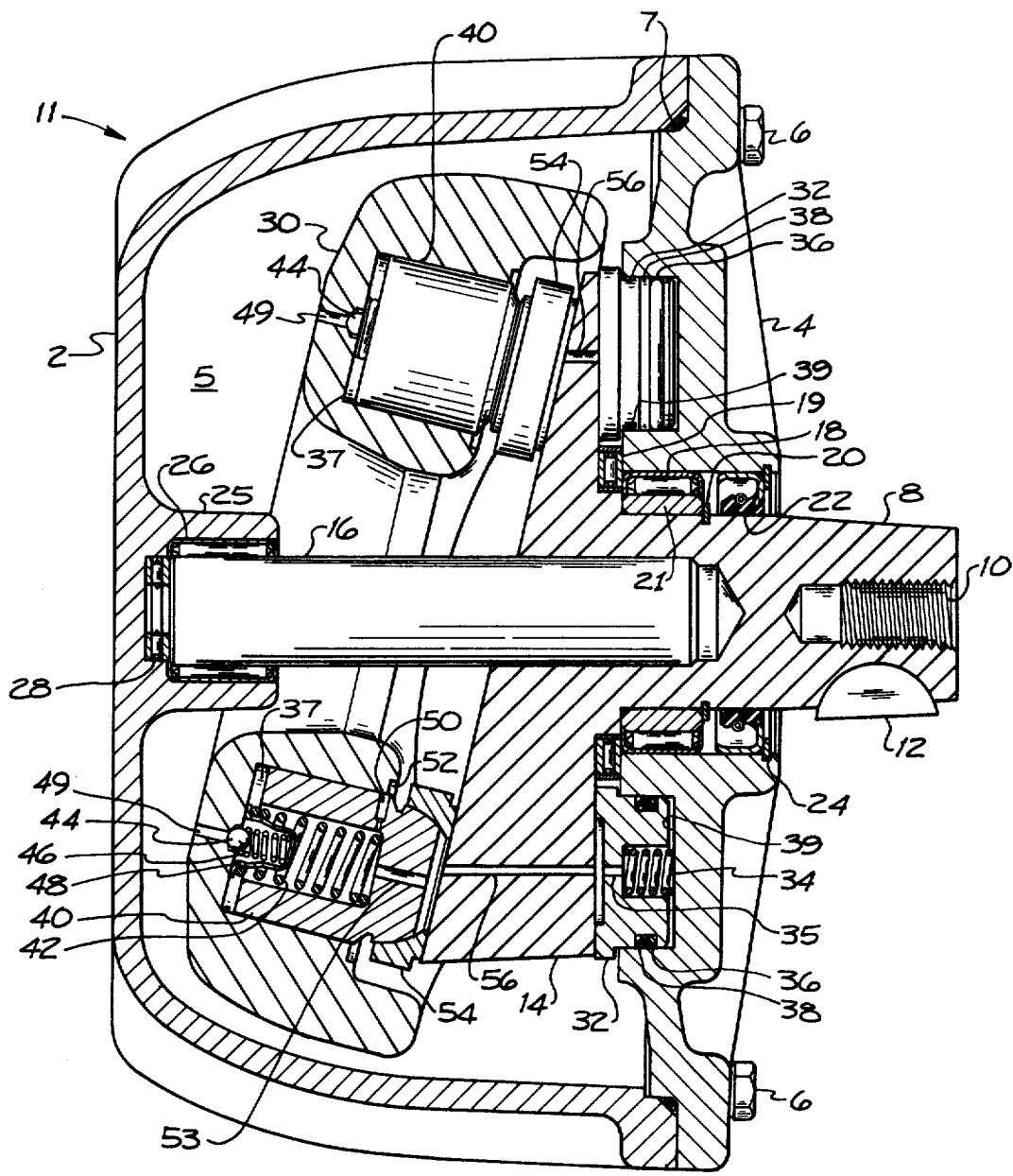
FIG. 1 is a section taken along the rotating axis with one of the cylinders in section and the rocker arm at the end of its stroke.

Referring now to FIG. 1, which is a sectional view taken along line 1 — 1 1 of FIG. 3, a description of the hydraulic coupling between the rotating input shaft 8 and the oscillating output shaft 70 will follow. The output shaft 70 (not seen in FIG. 1) is integrally connected to a hoop-shaped rocker arm 30, in which two bores 37, equidistant from the axis of shaft 70, are machined. These bores 37 are parallel to each other and lie in the same plane as the input shaft 8. A piston 40 is fitted in each bore and pivotally connected to a slipper shoe 54 by means of a ball and socket construction, allowing the slipper axis to incline with respect to the piston axis. Each piston 40 is counterbored to make room for a compression spring 42, which exerts a force sufficient to ensure that the piston 40 is always in contact with the inclined flat surface of cam plate 14 through its tiltable slipper shoe 54. A check valve is provided for each piston bore 37 to ensure that the bore remains filled with oil under all conditions. This check valve consists of passage 49, ball 44, ball spring 46, and spring keeper 48. The volume within the housing 2 and cover plate 4 is employed as an oil reservoir 5. The oil level is always above the check valve inlet passage 49, regardless of its position, ensuring that oil will flow in through the ball check 44 whenever the piston 40 extends in its bore 37, maintaining a filled chamber.

A rephasing passage 50 through the wall of piston 40 connects bore 37 of the cylinder to reservoir 5, if the piston is extended from its nominal position. Passage 50 will vent the fluid from the cylinder to reservoir as the piston retracts until it reaches the nominal position (shown in FIG. 1), at which time flow in passage 50 is cut off across groove 52 and the cylinder is properly in-phase. The pistons 40 when moving in the opposite direction, are free to extend, since oil will enter into cylinder bore 37 across ball check 44 from reservoir 5.

Located in housing cover plate 4 is a pair of bores 39 which contain piston members 32, hereafter referred to as balance pads 32. Located in the center of pad 32 is a passage 35 which in turn connects to cylinder bore 37 via passage 56 in the cam plate 14. Due to the numerous passages 56 located in cam plate 14 (see FIG. 2), bore 39 is in continuous contact with bore 37 regardless of the position of rotating cam plate 14. The diameter of pads 32 is essentially equivalent to the diameter of piston 40 whereby the thrust forces acting on both sides of cam plate 14 are equalized. Balance pads 32 are urged outward against the backside of cam plate 14 by spring members 34. O-ring 36 and backup washer 38 prevent fluid pressure from leaking from the backside of balance pads 32. As the pressure builds in cylinder bore 37 due to an increasing load on the transmission, a like force is created behind balance pad 32 to offset and equalize any forces on cam plate 14. In referring to FIG. 3, fill plug 88 is sealed with O-ring 86 as is drain plug 84. Dowel pin 3 locates cover plate 4 on housing 2.

Figure 4:
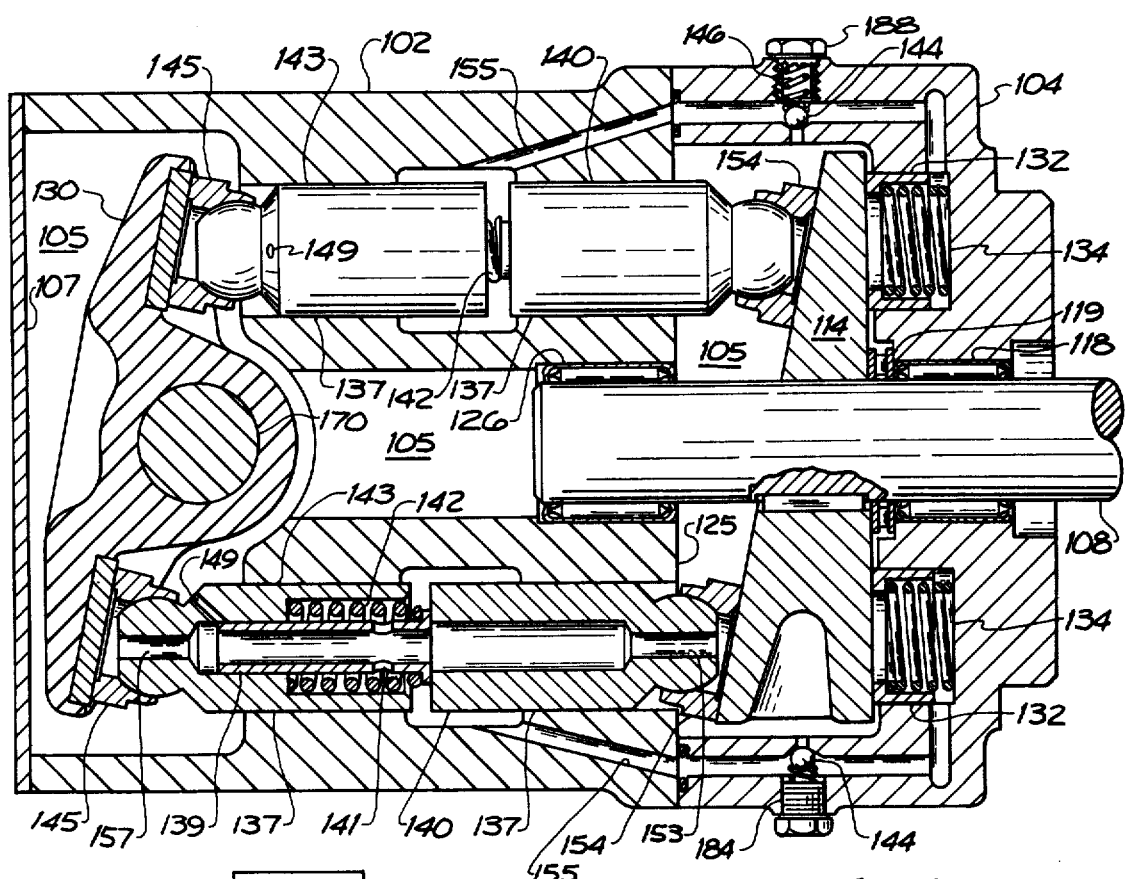
FIG. 4 is a longitudinal section of another embodiment of the invention.

FIG. 4, another embodiment of the invention, includes housing 102, cover 104, and closure 107, all of which encase the mechanism. Rotating input shaft 108, supported by bearing 118 in cover 104 and support bearing 126 in support 125, turns cam plate 114 which in turn drives cam pistons 140 in a pair of double piston cylinders 137. In the other end of cylinders 137 is a second piston 143 which bears on rocker shoe 145 which in turn bears on rocker arm 130 driving oscillating shaft 170. Balance pads 132 bear on back of cam plate 114 being urged by pad spring 134. Thrust bearing 119 is between back of cam plate 114 and cover 104. In each cylinder 137, piston spring 142 urges cam piston 140 and rocker piston 143 apart and their respective shoes 154 and 145 toward cam plate 114 and rocker arm 130 respectively. Bores 153 and 157, and sleeve 139 provide a hydraulic connection between shoes 154 and 145. Through ports 141 and connecting passages 155, the pressures in cylinders 137 and corresponding balance pads 132 are equalized. Fluid is recharged into connecting passage 155 through ball 144 and ball spring 146 from the interior space 105 which serves as a reservoir. Cam piston 140 and rocker piston 143 are rephased by sleeve 139 and port 149, similar to the method previously described for piston 40 and rephasing passage 50. Fluid is added through fill plug 188 and drained through drain plug 184.

Figure 5:
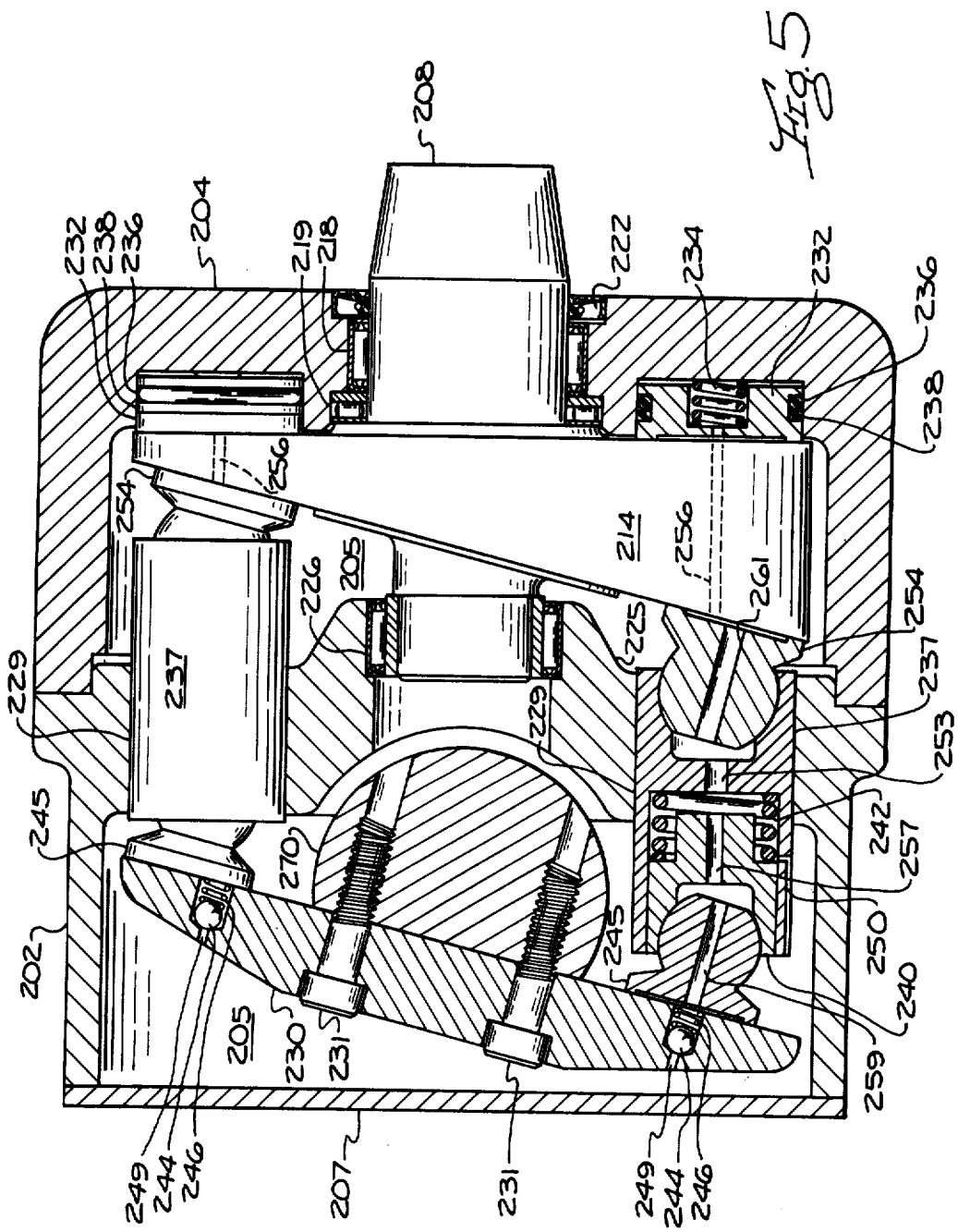
FIG. 5 is a longitudinal section of a third embodiment of the invention.

FIG. 5 shows a further modification which is a transition between the design in FIG. 4 and that in FIGS. 1 and 3. Housing 202, cover 204, and closure 207 encase the mechanism creating an interior space 205 which serves as a reservoir. Rotating input shaft 208, supported by bearing 218 in cover 204 and support bearing 226 in support 225, drives cam plate 214. Thrust bearing 219 is between the back of cam plate 214 and cover 204. Seal 222 seals shaft 208 in cover 204. A pair of cylinders 237 reciprocate in cylinder guides 229 as driven by cam shoes 254. Pistons 240 through rocker shoes 245 drive rocker arm 230 mounted by bolts 231 on oscillating shaft 270 which delivers the desired oscillating motion. A pair of balance pads 232 with pad springs 234, O-rings 236, and backup washers 238 bear against the back of cam plate 214, opposite cam shoes 254. Piston spring 242, within cylinders 237, maintains pistons 240 in an extended position. Cylinders 237 and balance pads 232 are recharged with fluid from interior space 205 through port 249 past ball 244 and ball spring 246 through bores 259, 257, 253 and 261 to face of cam plate 214, then through passages 256 to the backside of balance pad 232. Recharging occurs in the non-power or idle half of the cycle and rephasing occurs at the start of the power half of the cycle, when piston 240 retracts within cylinder 237 until rephasing passage 250 is closed by piston 240, thus automatically bringing rocker arm 230 into phase with cam plate 214.

MODE OF OPERATION

The hydrostatic oscillator drive 11 of the present invention is utilized to drive a sickle bar mower on a combine. An internal combustion engine provides the primary power source for the combine. The engine's rotating crank-shaft drives a hydrostatic pump which provides pressurized fluid to operate various functions on the combine such as the mower. In FIG. 6, a hydrostatic variable displacement motor 1, which is the immediate power source, drives the input rotating shaft 8 of the hydrostatic oscillator 11. The complete assembly of motor 1, oscillator 11, and the mower is supported on the combine header and can be raised and lowered as a unit. The housing 2 of the oscillator is mounted just above and adjacent to one end of the mower being connected to the movable mower blade 96 by connecting rod 94 and crank 92. The crank 92 is connected to the output oscillating shaft 70.

Within the housing 2, as seen in FIGS. 1 and 3, the input rotating shaft 8 drives a rotating cam plate 14 which in the preferred embodiment is integral with shaft 8. The rocker arm 30 is mounted on the output oscillating shaft 70, whose axis is at right angles to that of input shaft 8. The pair of opposed pistons 40 housed in cylinders 37 is equipped with swiveling slipper shoes 54 which bear against the sloped face of cam plate 14. The pair of balance pads 32 bear against the backside of cam plate 14 which is a plane surface normal to the axis of shaft 8. The balance pads 32 and shoes 54 are biased towards cam plate 14 by pad spring 34 and piston spring 42, tending to keep pads 32 and shoes 54 against cam plate 14. Pressurized fluid within cylinders 37 and on the backside of balance pads 32 also tend to move pads 32 and shoes 54 against cam plate 14. Piston 40 and balance pad 32 are equal in area to balance the loads on cam plate 14.

It is necessary to recharge cylinders 37 and pads 32 to make up for the fluid leakage between the various sliding surfaces. Recharging is accomplished by means of ball check valve 44 which permits fluid to be drawn from reservoir 5 into cylinders 37 whenever piston 40 extends due to the force of spring 42. Rephasing of pistons 40 is accomplished by forcing pistons 40 to retract in the bore, thereby venting fluid from the interior of the cylinders 37 via passage 50 until the flow in passage 50 is cut off at which time rocker arm 30 is in proper phase with rotating cam 14 (as seen in FIG. 1).

Figure 2:
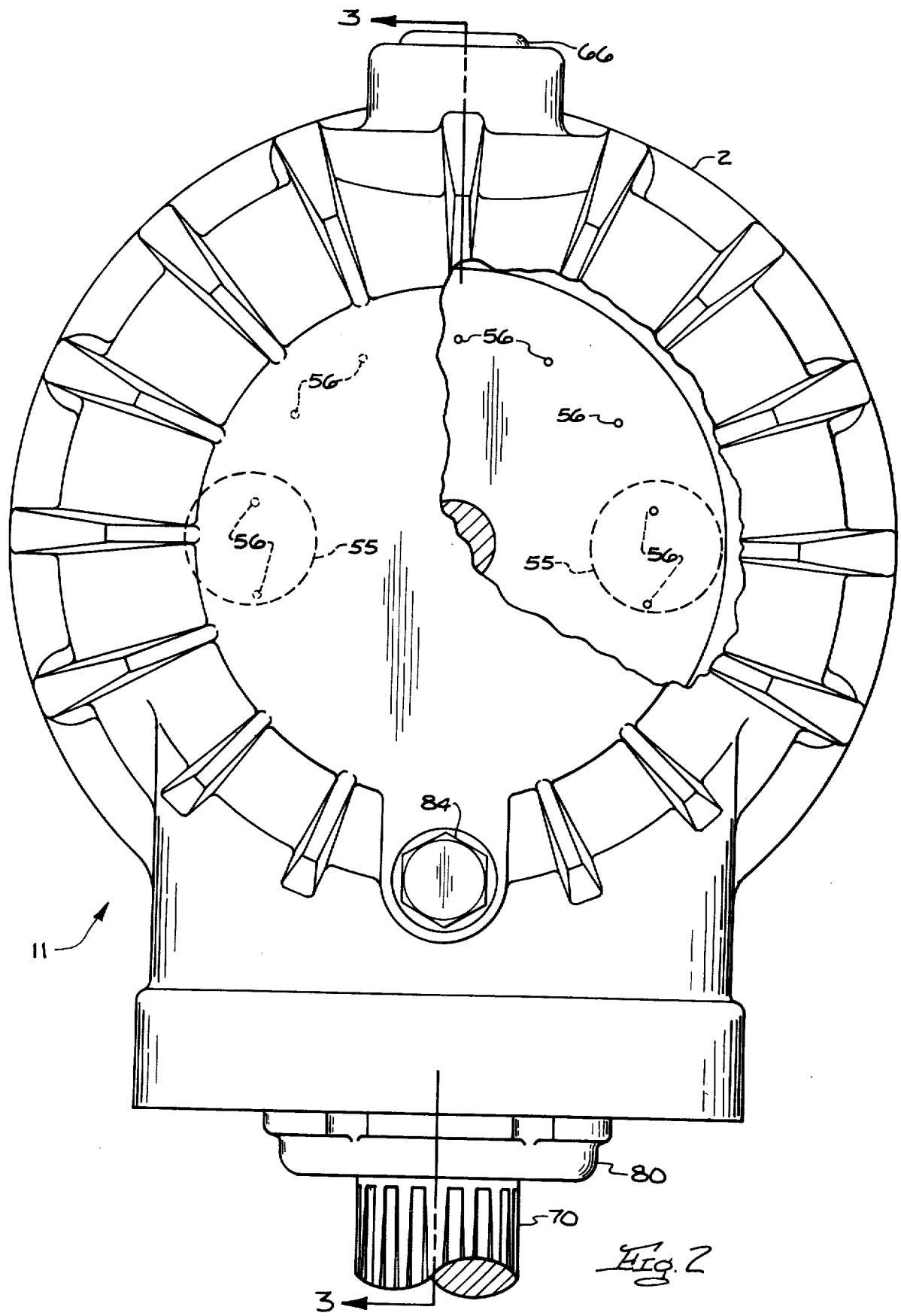
FIG. 2 is a view of the housing and oscillating output shaft partially cut away to show passages through the cam plate and their location with respect to the slipper shoes.

The opposing cylinders 37 alternately act as drive couplings between the cam plate 14 and the rocker arm 30, for 180° of travel while the opposite cylinder merely follows the cam plate due to the force of spring 42 until its drive stroke is again reached. The drive stroke of each cylinder 37 begins, as seen in FIG. 1, when the cam plate 14 begins to increase its thickness. The end of the drive stroke of that piston takes place after 180° rotation of the cam plate at that point of maximum cam plate thickness, as seen opposite the lower cylinder 37 in FIG. 1. In viewing FIG. 1, the lower piston 40 has just reached the end of its power stroke which has caused the rocker arm 30 to be tilted in a clockwise direction. Upper cylinder 37 is about to begin its power stroke as the cam plate begins to thicken, causing the rocker arm to tilt in a counterclockwise direction. As each cylinder 37 comes onto its power stroke, the expanding thickness cam plate forces piston 40 to retract in its bore causing fluid to vent from rephasing passage 50. When piston 40 reaches its in-phase position, flow is cut off in passage 50 via notch 52 and pressure builds inside of cylinder 37 and the rocker arm is forced to move with piston 40 to the end of its power stroke. At the end of its power stroke, the opposite cylinder 37 takes over, beginning its power stroke which moves the rocker arm in the opposite direction. Whenever one cylinder 37 is in its power stroke, the opposite cylinder 37 is being recharged with fluid via passage 49 due to the action of spring 42 which prevents the possibility of any slack in the system. The fluid pressure which builds within the power strokes of the various cylinders 37 is in continuous communication with the backside of balance pads 32 via passages 56 in cam plate 14. Due to the close radial spacing of passages 56, as seen in FIG. 2, there will always be at least one passage 56 communicating passage 53 of the cylinder with passage 35 of the balance pad.

Having described the invention with sufficient clarity to enable those familiar with the art to construct and use it, I claim:

1. A hydrostatic device to convert rotary to oscillating motion comprising:
    a housing;
    a rotating drive shaft journaled in the housing;
    a rotating cam plate connected to the drive shaft;
    an oscillating output shaft mounted in said housing on an axis normal to the axis of the drive shaft;
    a rocker arm mounted on the oscillating shaft;
    a pair of hydraulic cylinders positioned in driving relation between the rotating cam and the rocker arm, each cylinder is connected to the rocker arm on opposite sides of the oscillating shaft whereby oscillating motion is imparted to the rocker arm by the alternate driving force of each cylinder; and
    charging means connected to said cylinders to maintain said cylinders in a continuous charged condition.

2. A hydrostatic device as set forth in claim 1, including rephasing means in each cylinder which vents each cylinder until the cylinder reaches its proper degree of retraction and thereafter blocks any flow from said cylinder.

3. A hydrostatic device as set forth in claim 1, including: rephasing means in each cylinder which vents each cylinder until the cylinder reaches its proper degree of retraction and thereafter blocks any flow from said cylinder; and cam plate balancing means comprising two balancing pads positioned in chambers in the housing bearing against the backside of the cam plate urging same toward said cylinders with the chambers hydrostatically connected to said cylinders.

4. The hydrostatic device of claim 3 in which the connection between said balance pads and said cylinders comprises a plurality of passages through said cam plate.

5. The hydrostatic device of claim 1, wherein the cylinders comprise:
    a. a piston slidably positioned in said cylinder bore;
    b. a sliding shoe connected to said piston and bearing against said cam plate; and
    c. a spring in said cylinder urging said piston toward the extended position with the shoe against said cam plate.

6. The hydrostatic device of claim 3 in which the connection between said balance pads and said cylinders comprises a plurality of passages through said cam plate and axial passages through the cylinders and balance pads.

7. The hydrostatic device of claim 1, wherein the interior of the housing comprises a reservoir under partial pressure and the charging means includes a check valve connecting the interior of the housing with the cylinders to automatically charge said cylinder.

8. The hydrostatic device of claim 5 wherein the interior of the housing comprises a reservoir under partial pressure and the charging means includes a check valve connecting the interior of the housing with the cylinders; and a rephasing passage in said piston dumping fluid to said reservoir until the piston reaches the proper degree of retraction and flow is cut off in said passage by the overlapping cylinder bore.

9. The hydrostatic device of claim 5 in which said cylinder is an integral part within said rocker arm.

10. The hydrostatic device of claim 1, wherein the cylinders comprise:
 a. a piston slidably positioned in said cylinder bore;
 b. a sliding shoe connected to said piston and bearing against said cam plate;
 c. a spring in said cylinder urging said piston toward the extended position with the shoe against said cam plate; and
 d. a rephasing passage in the piston which is covered by the cylinder bore thereby blocking flow from the cylinder when the piston reaches its in-phase position.

11. The hydrostatic device of claim 1, wherein each cylinder comprises:
 a cylinder bore in said housing;
 a pair of telescoping pistons slidably positioned in said bore;
 spring means between the pair of telescoping pistons urging same toward the extended position; and
 rephasing means in each cylinder comprising a passage in one of said pistons which opens the cylinder to drain when the pistons are sufficiently extended and is closed when the passage is blocked by the overlapping of its companion telescoping piston when the pistons reach their in-phase position.

* * * * *